Nov. 12, 1935.  F. W. WILSON  2,020,447
SAND BLAST APPARATUS
Filed Feb. 21, 1935  7 Sheets-Sheet 2

INVENTOR
F. W. Wilson

Nov. 12, 1935.  F. W. WILSON  2,020,447
SAND BLAST APPARATUS
Filed Feb. 21, 1935   7 Sheets-Sheet 3

INVENTOR
F. W. Wilson

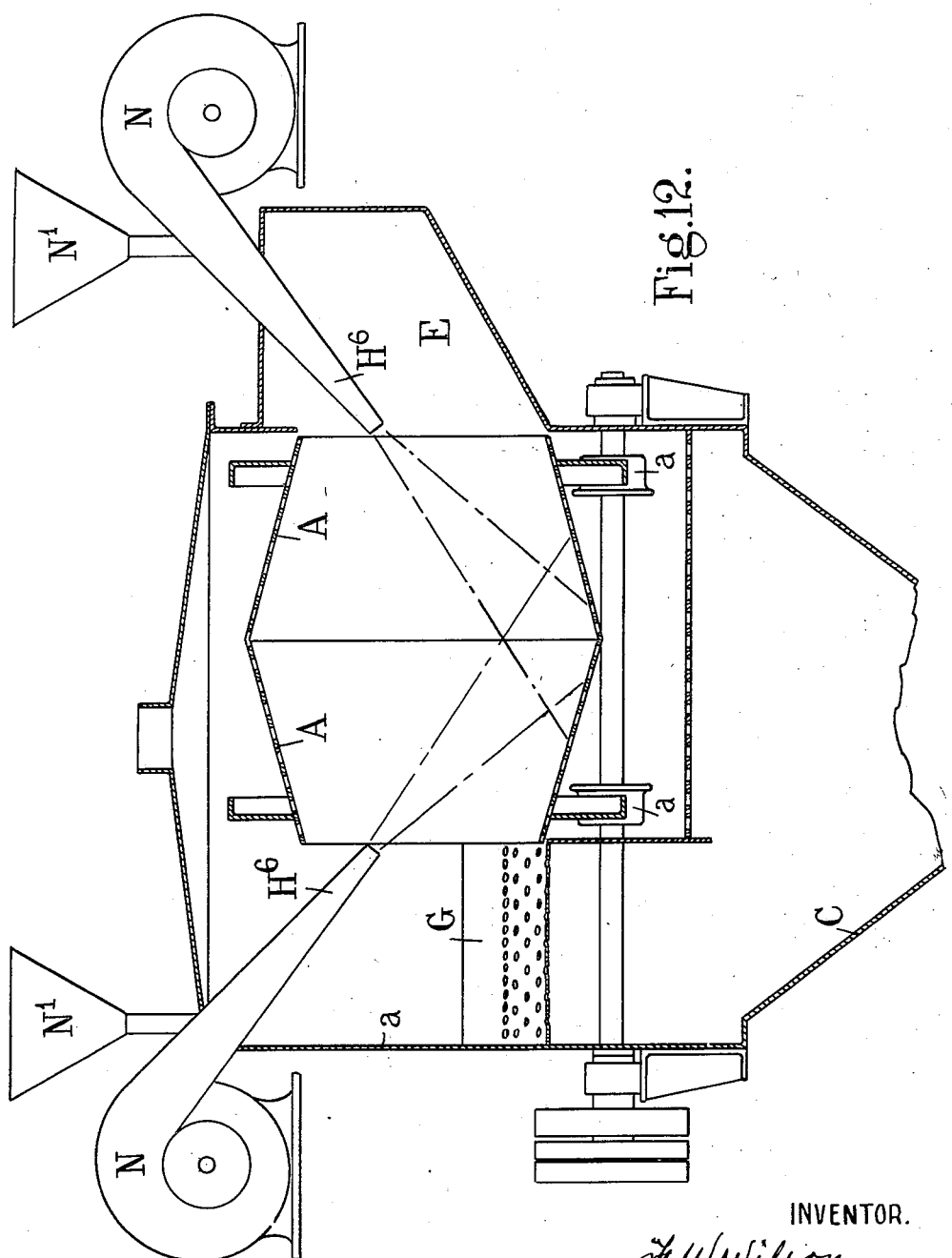

Patented Nov. 12, 1935

2,020,447

UNITED STATES PATENT OFFICE 2,020,447

SAND BLAST APPARATUS

Frederick William Wilson, Sale, England, assignor of one-half to St. George's Engineers Limited, Salford, England Application February 21, 1935, Serial No. 7,500
In Great Britain March 14, 1934

9 Claims. (Cl. 51—13)

This invention relates to sand blast apparatus of the rotary barrel type for cleaning small castings and forgings.

Such rotary barrel is commonly closed with a charging door at one side through which it is charged and emptied at intervals and the object of the invention is to provide for a continuous cleaning and continuous loading, travel and discharge of the articles through the barrel while revolving and under the action of the sand blast. The rate of continuous feed controls the rate of continuous traverse of the articles through the barrel and the continuous discharge therefrom.

According to the invention the apparatus comprises a horizontal perforated rotary barrel open at both ends formed of two truncated cores so connected as to provide a through passage for the articles under treatment, a feed chute at one end of the barrel through which the barrel may be continuously loaded and a discharge chute at the opposite end to effect a continuous discharge, means whereby a continuous blast of abrasive material is projected into the interior of the barrel upon the articles therein, and a casing within which the rotary perforated barrel is enclosed.

The invention will be fully described with reference to the accompanying drawings:—

Fig. 1 is a diagrammatic sectional elevation illustrative of sand blasting apparatus to which the invention applies.

Fig. 2 longitudinal section through the rotary barrel and its casing.

Fig. 12 is a longitudinal section showing a modified disposition of blast apparatus with rotary blowers.

The apparatus is constructed with a rotary perforated barrel A to receive the articles to be cleaned mounted within a dustproof casing $a$ on rollers $a1$ by which it is rotated, a chamber or hopper C to collect the dust and abrasive material falling through the perforations of the barrel, an elevator D to raise the dust and spent abrasive to a separating chamber $D^1$ in which they are separated, a compression chamber $D^2$ into which the abrasive when separated falls and pipes $d$ through which the abrasive is forced up by compressed air into a receptacle for re-use.

In carrying out the invention the barrel A is constructed of two truncated cores connected together at the centre and open at both ends the articles to be treated being loaded in at one end and discharged at the opposite end. A loading or feeding chute E is erected adjacent to one end of the barrel into which the articles are fed by hand charging, or by a conveyer or elevator F and a discharge chute G is erected at the opposite end of the barrel A. By this construction a continuous feed and loading of the castings or forgings a continuous traverse thereof through the barrel A and a continuous discharge or output is achieved. The articles are fed in continuously from the chute E and traverse the barrel A and are delivered through the chute G in a continuous stream the rate of delivery being controlled by the rate of feed.

Figure 1:
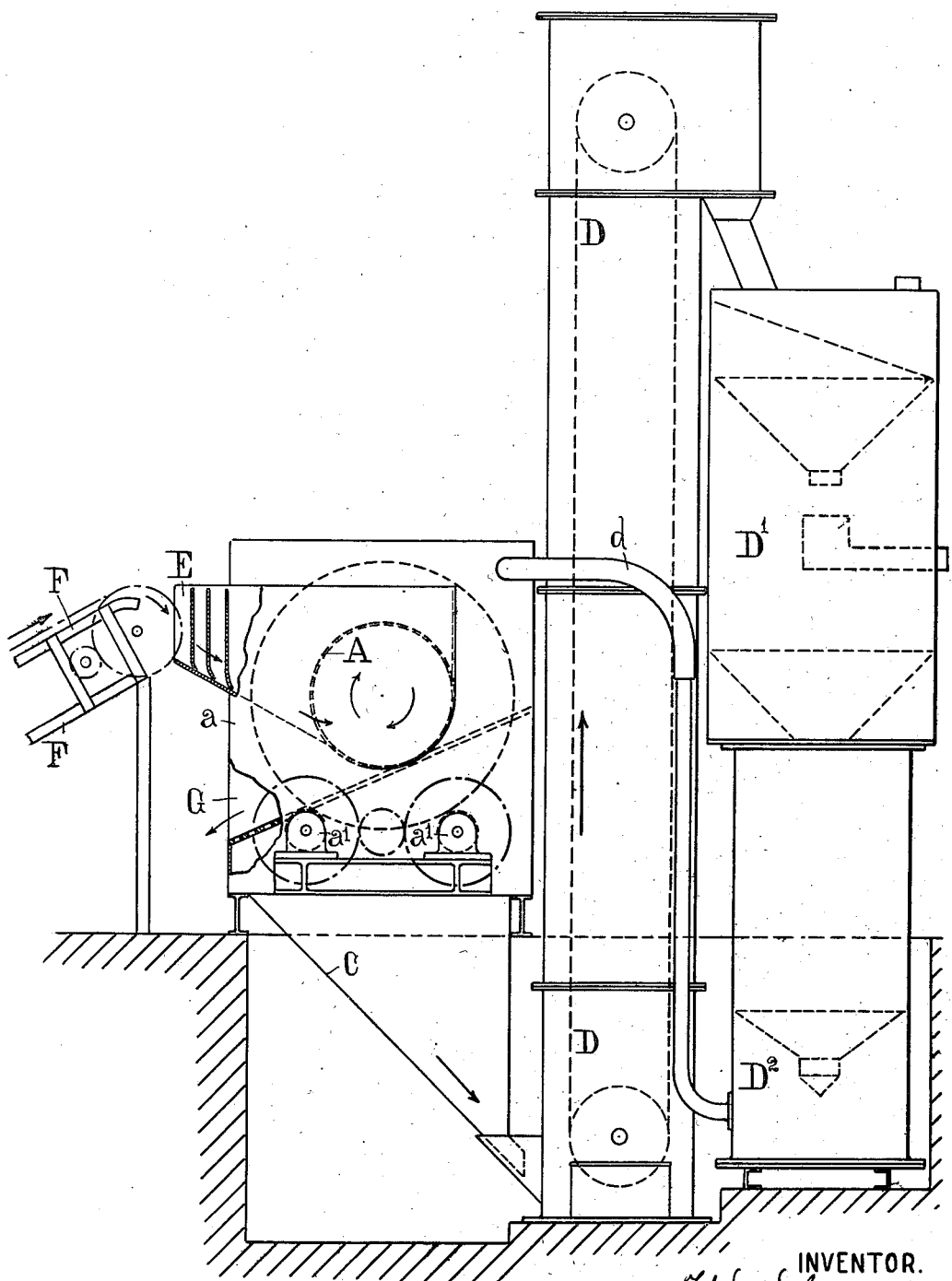
Figure 2:
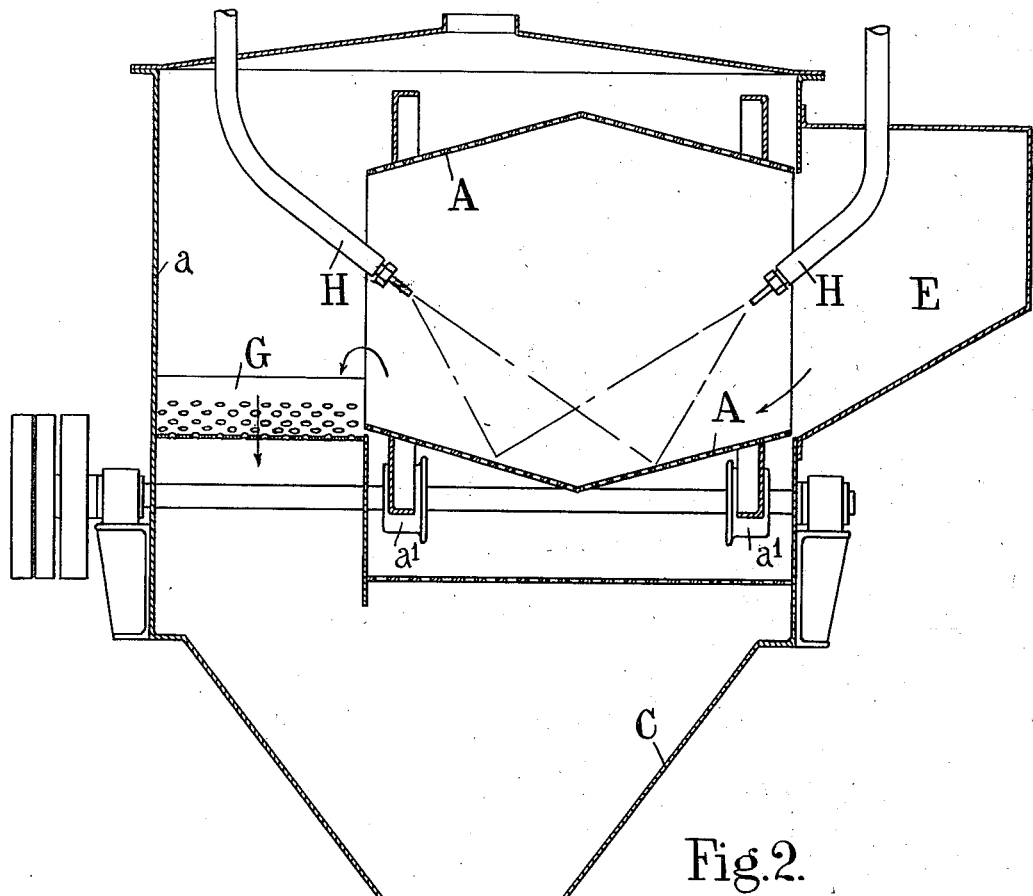
Figures 3, 5, 6:
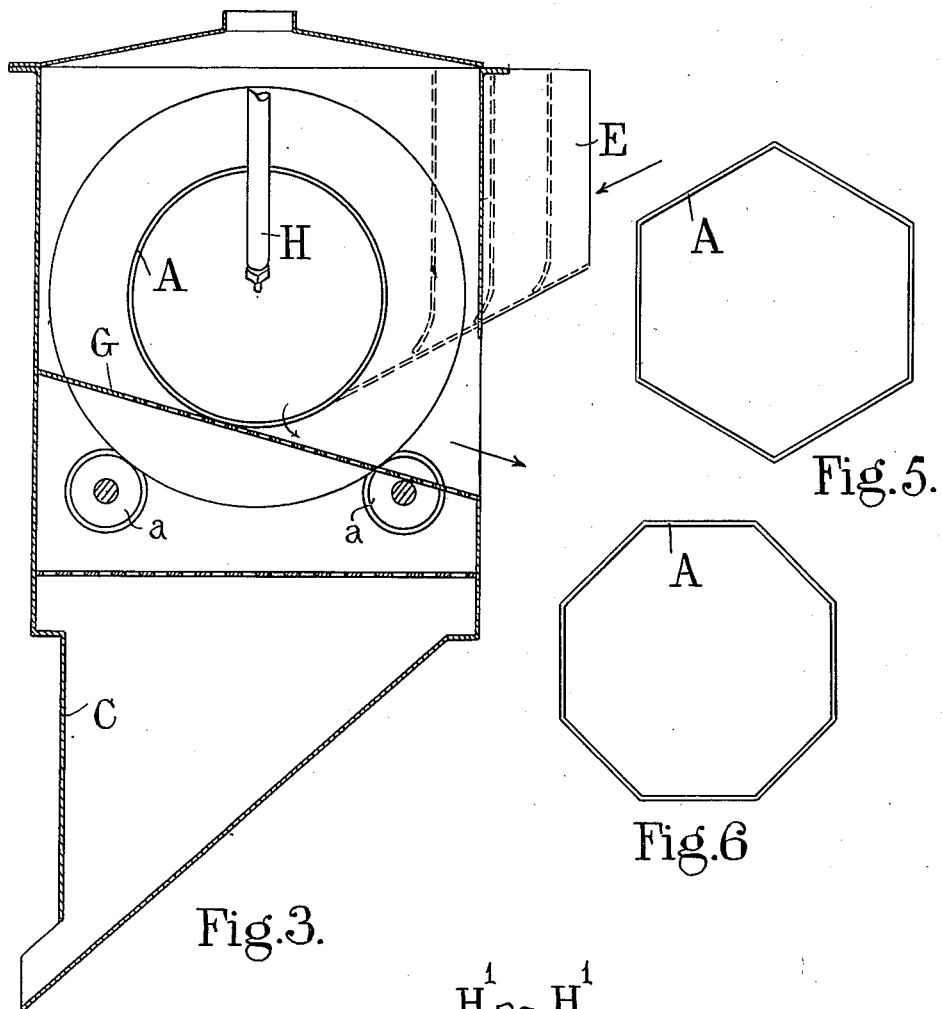
Fig. 3 is an end elevation partly in section showing the discharge end of the rotary barrel.
Figs. 5 and 6 are transverse sections showing different shapes of the rotary barrel.

In the form shown in Figs. 1, 2 and 3 the open ended barrel A is constructed of two truncated cones of largest diameter at the centre forming a central or working zone where the articles will temporarily pile up and the sand blast be concentrated upon them. Sand blast nozzles H are fitted at each end of the barrel to discharge a blast of abrasive upon the castings or forgings as they traverse through the barrel.

Figure 4:
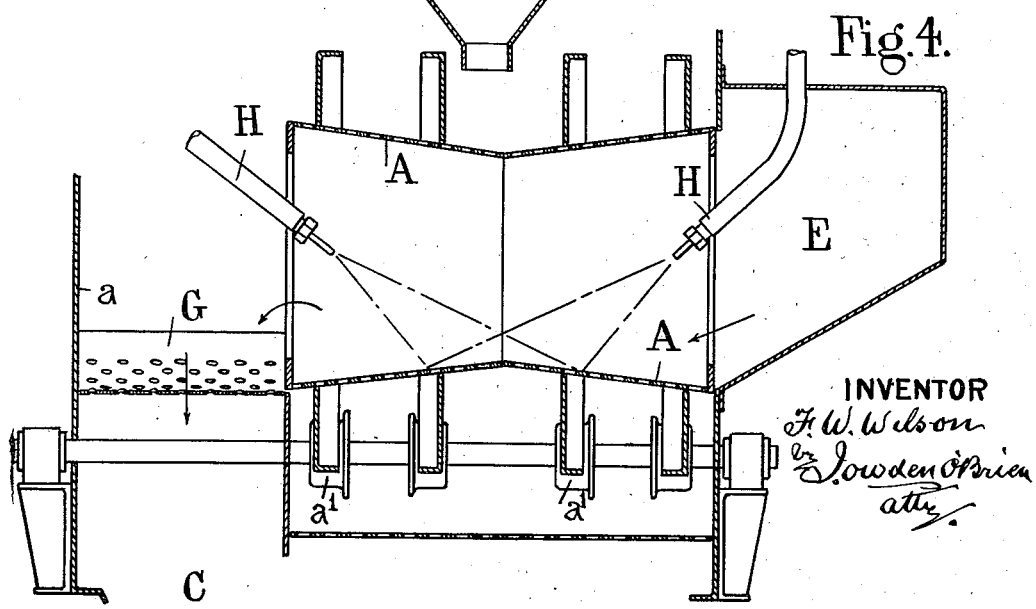
Fig. 4 is a longitudinal section showing a modified construction of rotary barrel.

In the form shown in Fig. 4 the open ended barrel A is constructed of two truncated cones of smallest diameter at the centre and largest diameter at the ends the sand blast nozzles H being fitted to discharge a blast of abrasive into the barrel at each end.

The barrel A may be cylindrical or of the shape shown in Figs. 5 or 6 in cross section.

Figure 7:
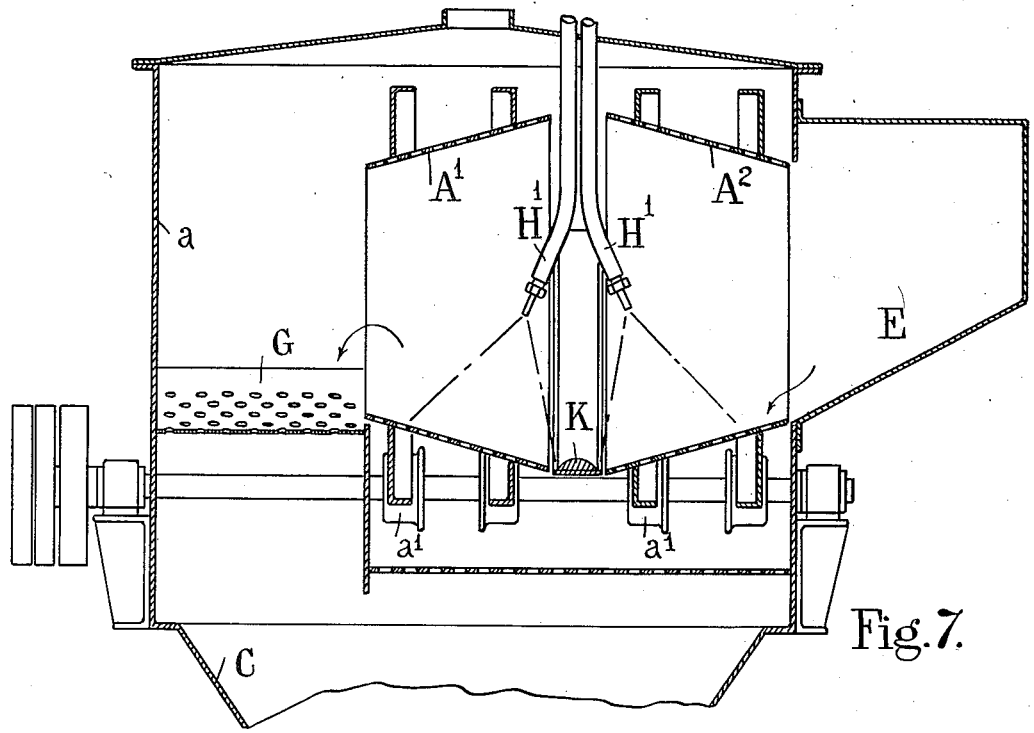
Fig. 7 is a longitudinal section showing a modified construction of rotary barrel and disposition of blast nozzles.
Figure 8:
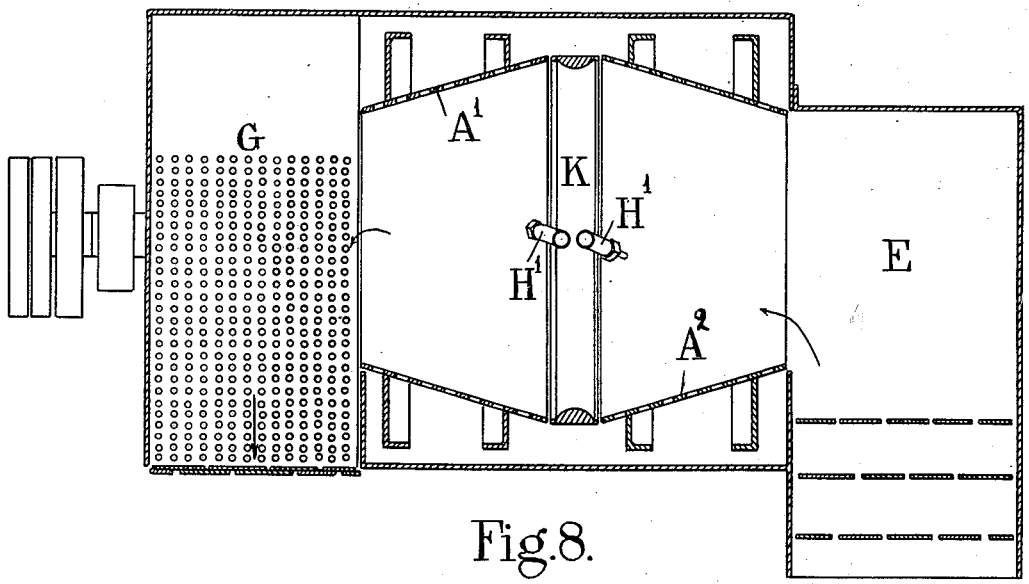
Fig. 8 is a plan of Fig. 7.

In the form shown in Figs. 7 and 8 the barrel is constructed in two parts $A^1$, $A^2$ connected by a stationary division piece K to provide a continuous through passage and the sand blast nozzles H¹ are disposed centrally between the two parts.

Figure 9:
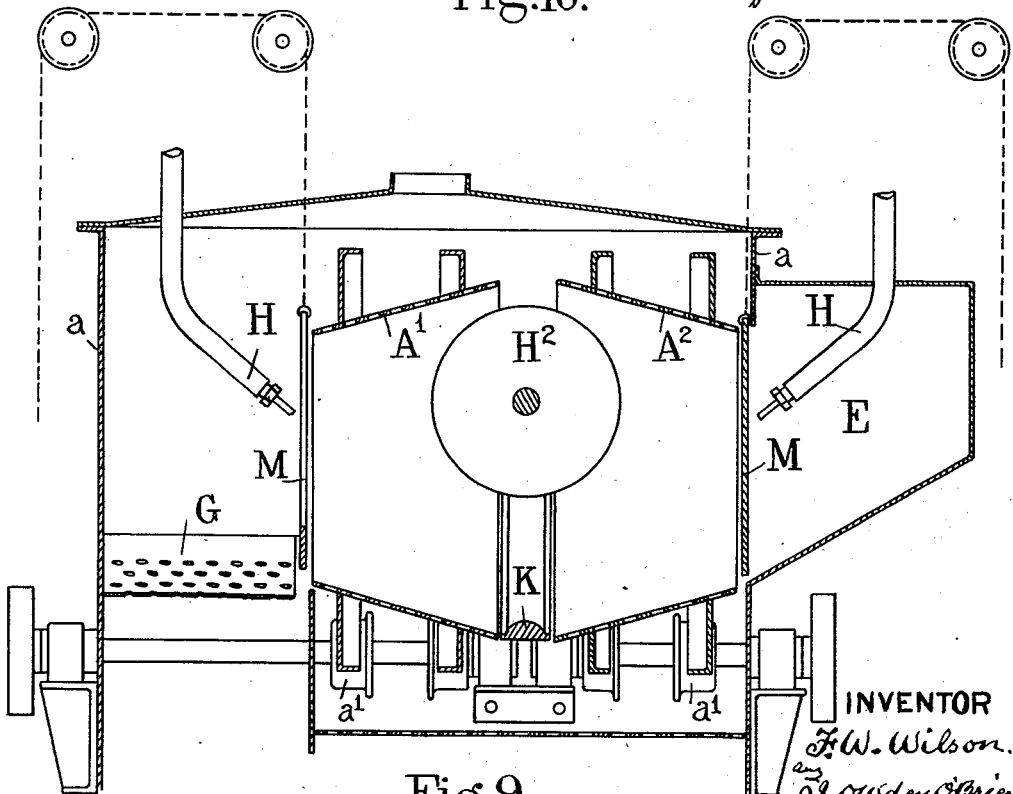
Fig. 9 is a longitudinal section showing further modification of rotary barrel in two sections with two driving shafts adapted to be driven at different speeds or in reverse directions.

In the form shown in Fig. 9 the barrel is constructed in two parts A¹, A² connected by a stationary division piece K to provide a continuous through passage. Sand blast nozzles H are disposed at the ends and/or a centrifugal sand blast wheel H² may be mounted centrally between the two parts. The ends of the barrel may be fitted with dampers or shutters M with slots through which the blast is blown by which the passage of articles to or from the barrel may be regulated. The parts A¹, A² may be mounted separately on the rollers a' to be rotated at different speeds or in reverse directions.

Figure 10:
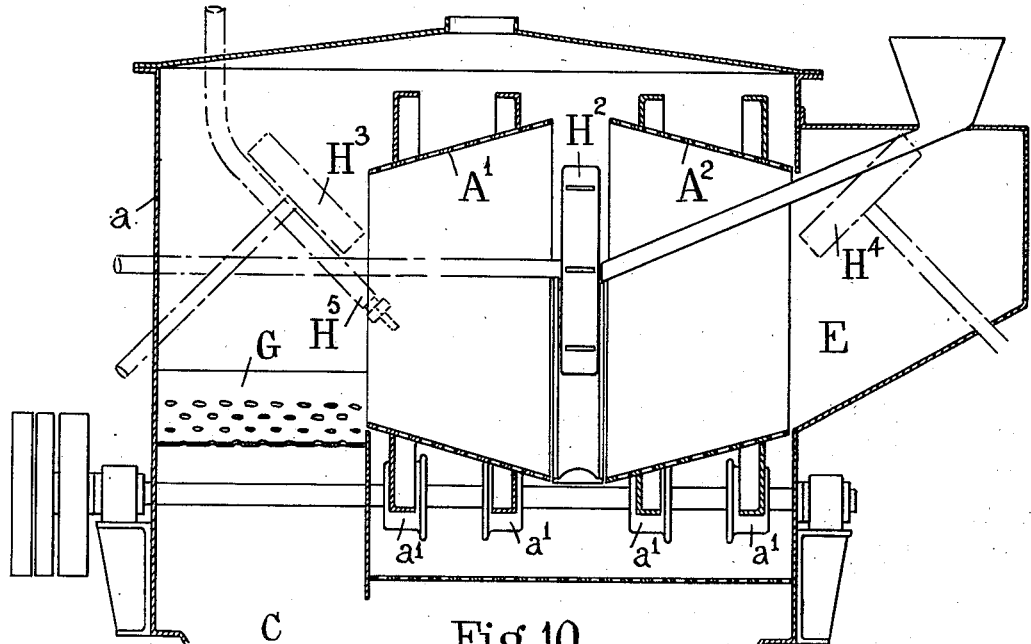
Fig. 10 is a longitudinal section showing further modifications of divided barrel and centrifugal abrasive wheels.

The form shown in Fig. 10 is similar to that shown in Fig. 9 showing how the apparatus may be fitted centrifugal blast wheels H², H³, H⁴ disposed in convenient positions either with or without a blast nozzle H⁵.

Figure 11:
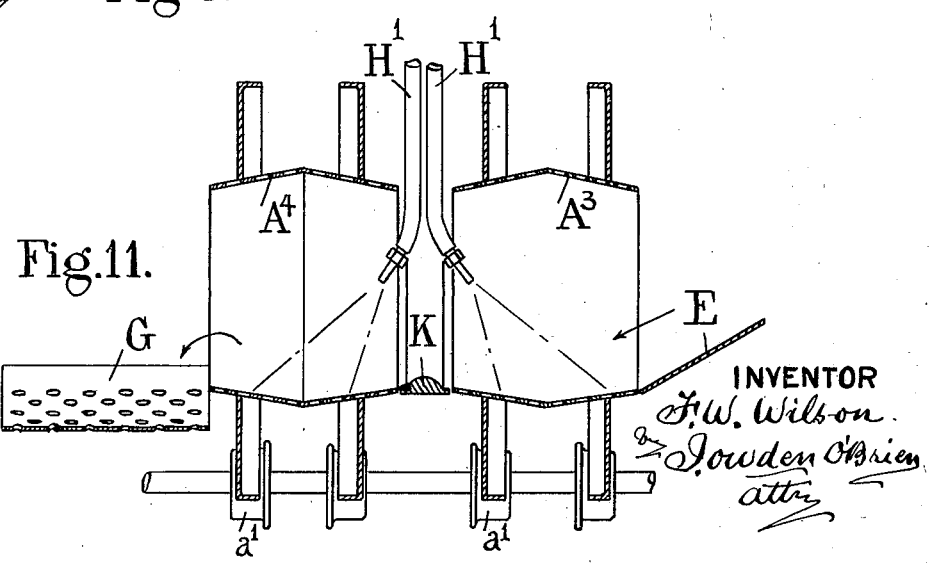
Fig. 11 is a longitudinal section showing further modifications of two connected barrels.

In the form shown in Fig. 11 two separate barrels A³, A⁴ are shown connected by a division piece K to provide a continuous through passage and the blast nozzles H¹ disposed between them. The form shown in Fig. 12 is similar to that shown in Figs. 1 to 3 with rotary blowers N to create the blast and hoppers N¹ through which the abrasive is fed into the blast nozzles H⁶.

Figure 13:
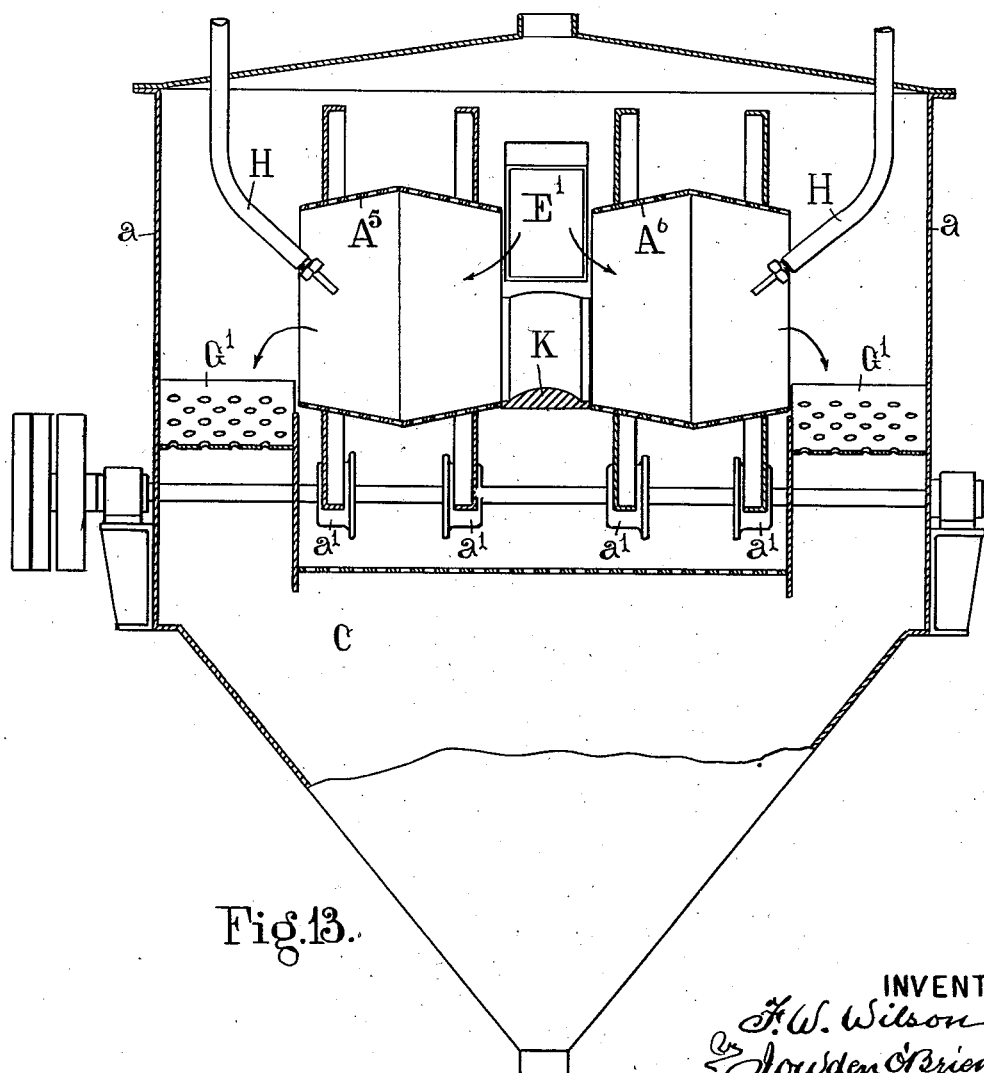
Fig. 13 is a longitudinal section of modified construction of two barrels showing feed chute at the centre and discharge at the ends.

In the form shown in Fig. 13 two separate barrels or a barrel divided into two parts A⁵ and A⁶ are shown with a feed chute E¹ between them and a delivery chute G¹ at each outside end.

What I claim as my invention and desire to protect by Letters Patent is:—

1. Continuous sand blast apparatus comprising a rotary perforated horizontal barrel formed of two truncated cones, open at both ends to receive the articles, a dust proof casing surrounding the barrel, a shaft passing through the casing upon which the barrel rests and by which it is rotated, a feed chute at one end of the barrel and a delivery chute at the other end thereof articles being fed in at the feed end and passed to the delivery end by the pressure of succeeding articles, nozzles for supplying abrasive material on to the articles in the barrel, a perforated screen below the barrel through which spent abrasive and dust falls, and a hopper forming the base of the dustproof casing to collect the spent abrasive and dust.

2. Continuous sand blast apparatus comprising a rotary perforated horizontal barrel formed of two truncated cones open at both ends to receive the articles, a dustproof casing surrounding the barrel, a shaft passing through the casing upon which the barrel rests and by which it is rotated, a feed chute at one end of the barrel and a delivery chute at the other end thereof articles being fed in at the feed end and passed to the delivery end by the pressure of succeeding articles, nozzles for supplying abrasive material on to the articles in the barrel, a perforated screen below the barrel through which spent abrasive and dust falls, a hopper forming the base of the dustproof casing to collect the spent abrasive and dust, a conveyer by which the articles are fed continuously to the feed chute, and a second conveyer by which the treated articles are continuously led away from the delivery chute.

3. Continuous sand blast apparatus comprising a rotary perforated horizontal barrel formed of two truncated cones open at both ends to receive the articles, a dustproof casing surrounding the barrel, a shaft passing through the casing upon which the barrel rests and by which it is rotated, a feed chute at one end of the barrel and a delivery chute at the other end thereof, articles being fed in at the feed end and passed to the delivery end by the pressure of succeeding articles, nozzles for supplying abrasive material on to the articles in the barrel, a perforated screen below the barrel through which spent abrasive and dust falls, a hopper forming the base of the dust proof casing to collect the spent abrasive and dust, an elevator to raise the spent abrasive and dust, a separating chamber in which said spent abrasive and dust are deposited and separated, a compression chamber into which the separated abrasive falls, a nozzle feed chamber communicating with the nozzles, and pipes through which the abrasive is forced by compressed air from the compression chamber to the nozzle feed chamber.

4. Continuous sand blast apparatus comprising a rotary perforated horizontal barrel formed of two truncated cones open at both ends to receive the articles, a dustproof casing surrounding the barrel, a shaft passing through the casing upon which the barrel rests and by which it is rotated, a feed chute at one end of the barrel and a delivery chute at the other end thereof articles being fed in at the feed end and passed to the delivery end by the pressure of succeeding articles, nozzles for supplying abrasive material on to the articles in the barrel, a perforated screen below the barrel through which spent abrasive and dust falls, a hopper forming the base of the dustproof casing to collect the spent abrasive and dust, a conveyer by which the articles are fed continuously to the feed chute, a second conveyer by which the treated articles are continuously led away from the delivery chute, an elevator to raise the spent abrasive and dust, a separating chamber in which said spent abrasive and dust are deposited and separated, a compression chamber into which the separated abrasive falls, a nozzle feed chamber communicating with the nozzles, and pipes through which the abrasive is forced by compressed air from the compression chamber to the nozzle feed chamber.

5. Sand blast apparatus as in claim 1 characterized by an open ended rotary barrel constructed in two parts separated by a stationary division plate and sand blast nozzles disposed centrally between them.

6. Sand blast apparatus as in claim 1 characterized by an open ended rotary barrel constructed in two parts in combination with a feed chute between delivery chutes at the outside ends and sand blast means conveniently disposed to project the abrasive into the interiors.

7. Sand blast apparatus as in claim 1 characterized by an open ended rotary barrel constructed in two parts separated by a stationary division plate and a centrifugal blast wheel disposed centrally between them with sand blast nozzles at the ends.

8. Sand blast apparatus as in claim 1 characterized by an open ended rotary barrel constructed in two parts adapted to be rotated at different speeds and in reverse directions.

9. Sand blast apparatus as in claim 1 characterized by dampers fitted at the ends of the barrel by which the passage of the articles therethrough may be regulated.

FREDERICK WILLIAM WILSON.